Jan. 10, 1928.
W. R. BELDAM
PACKING
Filed Jan. 14, 1926
1,655,589
2 Sheets-Sheet 1
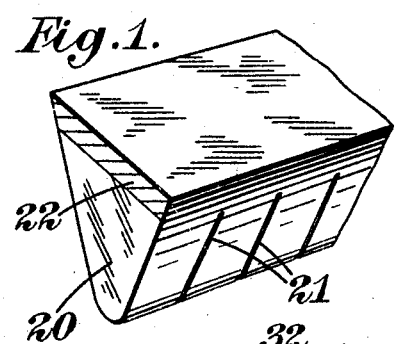
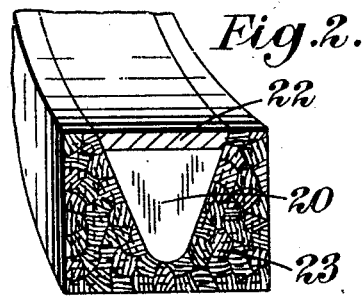
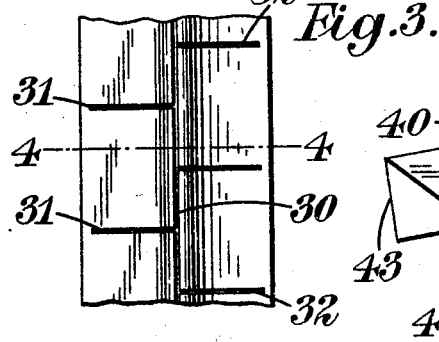
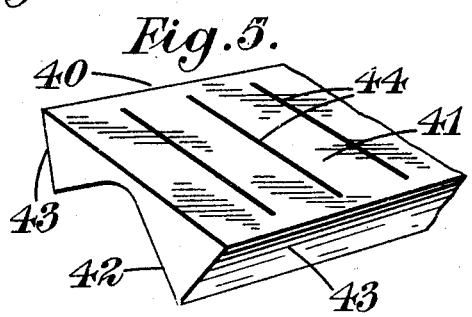
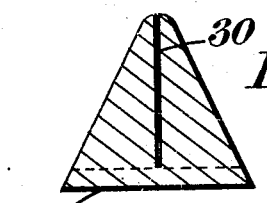
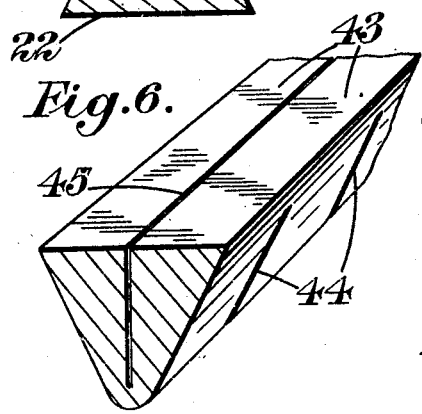
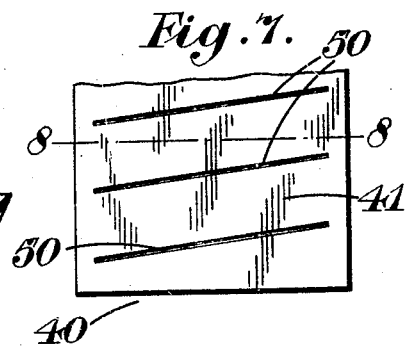
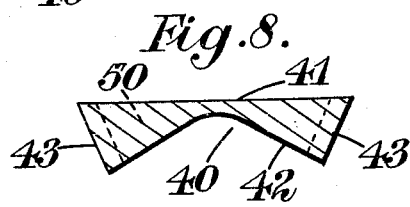
INVENTOR
William Robert Beldam
by Byrnes, Stebbins & Barnslee
his Attorneys Jan. 10, 1928. 1,655,589
W. R. BELDAM
PACKING
Filed Jan. 14, 1926 2 Sheets-Sheet 2
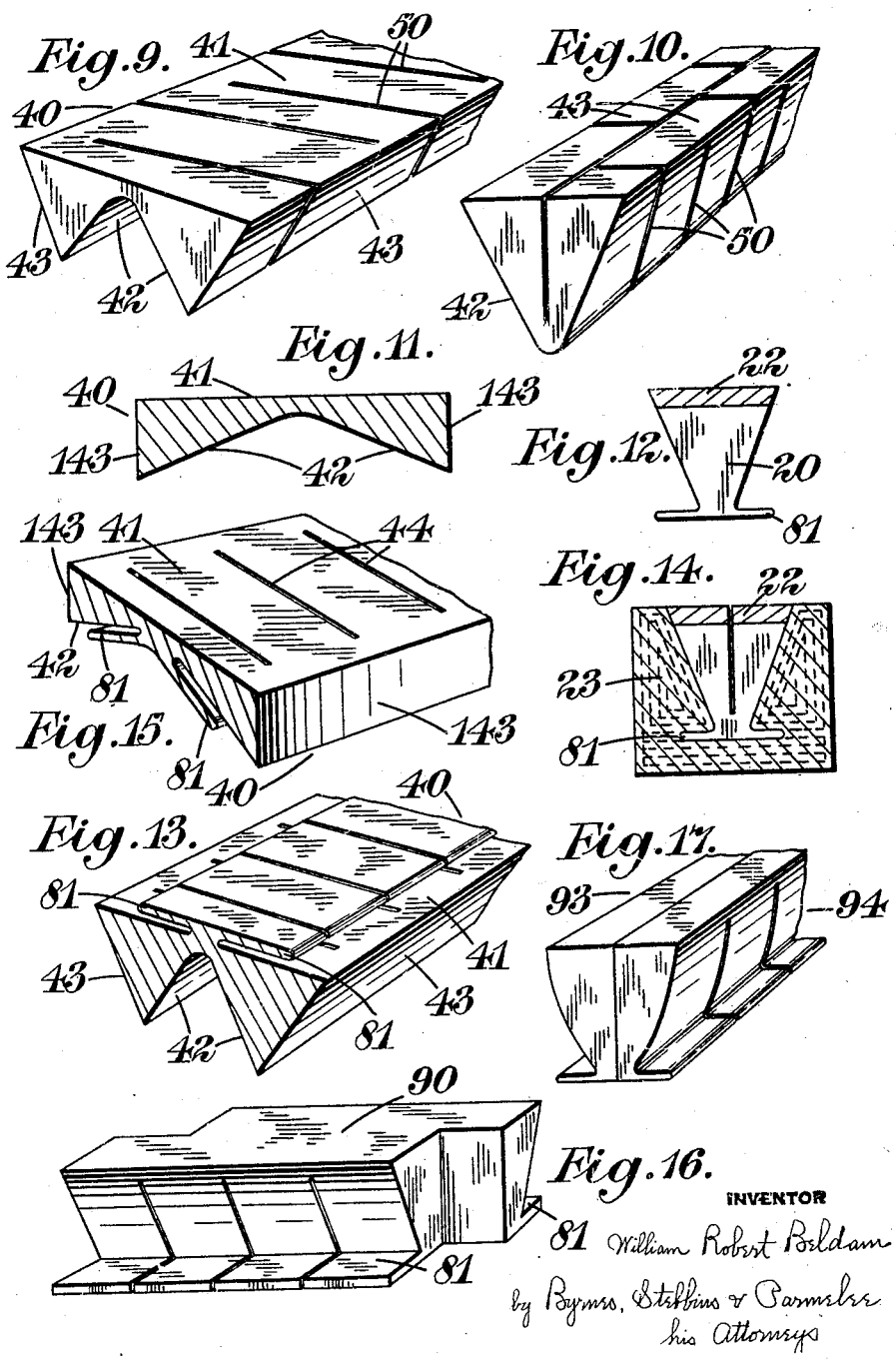

Patented Jan. 10, 1928.

1,655,589

UNITED STATES PATENT OFFICE.

WILLIAM ROBERT BELDAM, OF HOUNSLOW, ENGLAND, ASSIGNOR TO BELDAM ASBESTOS COMPANY LIMITED, OF HOUNSLOW, ENGLAND, A BRITISH COMPANY.

PACKING.

Application filed January 14, 1926, Serial No. 81,231, and in Great Britain April 6, 1925.

This invention is for improvements in or relating to packing, such as is used for piston-rods, of the type wherein an integral or composite strip of material (for example white metal), preferably embedded in a backing of soft material, such as asbestos or other fibrous or textile substance, is intended to be placed in a gland having thrusting means, such as a gland-nut, arranged to thrust the strip forward against the piston-rod or other member to be packed.

When packing of this kind is of V shape in cross-section and is placed like an open ring around the member to be packed, the wider end face of the V as viewed in cross-section constitutes the front face of the packing and in use lies at the inner periphery of the ring and bears against the member to be packed; transverse slots have been provided in such a strip extending from the said wider face towards the ridge at the back of the V, which ridge was in the form of a continuous band lying on the outer periphery of the ring. On the packing wearing away the strip could be advanced towards the member encircled by it until the two ends of the strip abutted together, whereupon further advance was hindered or prevented owing to the said band resisting further contraction.

This invention has for its main object to obviate this defect and to provide that even when the ends of the strip have been brought together it can be still further advanced.

According to a primary feature of this invention there is provided a packing of the type described having transverse cuts that, when the packing is in position, extend from that side of the said strip which will be outermost so far towards the opposite inner side thereof as to leave material at the base of the strip which serves to connect together parts of the strip bounded by the cuts and is intended to bear against the member to be packed, for permitting further contraction of the strip after the ends of the strip abut together due to the wear of the base of the strip.

Conveniently, the said material at the base of the strip is in the form of a band that is continuous along the said inner side intended to bear against the member to be packed. When this band is worn away the strip will be divided into a number of separate pieces which can be advanced towards the member to be packed as further wear occurs. For example, a strip encircling a member to be packed may be divided into two, three or more parts.

According to another feature of the invention the strip is divided longitudinally from the said outer side down to the base into two parts (which will be circumferential parts) connected together at the base, and the transverse slots are either oblique to the line of division, or in one of said parts they are staggered relatively to those in the other of said parts.

According to a further feature of the invention packing as set forth above is provided at the said outermost side with a foot which, when the packing is in position, will extend laterally in both directions. When the strip is embedded in a backing and the said material at the base of the strip is worn away and the strip of material is consequently divided into a number of separate pieces, the latter are still prevented by the said foot from being drawn out of the backing.

Conveniently, the foot is of such thinness as to yield under the effort of the thrusting means aforesaid so that the advance of the strip is not prevented but is checked when the strip is embedded in a backing.

The invention also provides a metallic packing strip in the form of a bar that is flat on one face and has its opposed face in the form of a V with the narrower end of the V lying towards the said flat face, characterized in that cuts or slots lying transversely of the direction of length of the bar extend through the middle of said flat face of the bar to the said opposed face and outwards towards each side face of the bar, which cuts or slots terminate at their outer ends at situations spaced away from the said side faces.

If desired, packing as described above, may be made composite, that is to say may be built up of units.

Other features of the invention will be described hereinafter and pointed out in the claims.

In order that the invention may be clearly understood reference will be made to the accompanying drawing diagrammatically showing several embodiments thereof by way of example. In the drawing:—

Figure 1 is a perspective view showing in perspective one form of metallic strip according to the invention, and Figure 2 is a like view showing the strip embedded in a backing;

Figure 3 is a plan view, and

Figure 4 a sectional elevation taken on the line 4—4 in Figure 3 showing a modified form of strip;

Figure 5 is a perspective view of a bar, and

Figure 6 is a like view of a strip formed by folding the said bar;

Figure 7 is a plan view, and

Figure 8 is a sectional elevation taken on the line 8—8 in Figure 7 showing a modified form of bar for forming a strip;

Figures 9 and 10 are views like Figures 5 and 6 respectively showing another form of bar and strip;

Figure 11 is a cross-section taken through another form of bar;

Figure 12 is a transverse vertical section taken through a modified form of strip provided with a foot, and Figure 13 is a perspective view of another form of bar for providing a strip with a foot;

Figure 14 is a sectional elevation showing a strip formed by folding the bar shown in Figure 13 and embedded in a backing;

Figure 15 is a perspective view of another form of bar for providing a strip with a foot;

Figure 16 is a perspective view illustrating part of a composite strip, and

Figure 17 is a perspective view illustrating another form of composite strip.

Like reference numerals designate like parts throughout the several views.

Referring first to Figures 1 and 2, a strip 20 of anti-friction metal, such as white-metal, is formed by rolling, casting, extrusion or otherwise so as to have a V-shaped section, whereupon a number of transverse parallel knife cuts 21 are made in the back ridge of the strip which extend through almost to the front flat face. The cuts are of equal depth which is such as to leave at the front of the strip a band 22 of material, say $\frac{1}{16}$th of an inch thick, intended to bear against the member, such as a piston-rod, to be packed. This metal strip is embedded as usual in a soft backing 23 of asbestos or the like and when cut to a convenient length is ready for insertion in a gland.

When the packing is placed in position and encircles the piston-rod the two ends of the metal strip in the form of a closed ring will preferably be spaced so far apart that only when the said band of material is worn away do they abut together. The separate wedges into which the strip is then divided will contact one with another at the inner periphery of the packing and can be still further advanced as they wear away, whereby the life of the packing is lengthened as compared with that of known packing of the type above referred to.

It is to be noted that the separate wedges move toward the packed member by simple inward radial movement, as distinguished from a movement compounded of the circumferential creep around the packed member together with an inward movement. The latter type of inward displacement of the packing wedges takes place with packing as heretofore constructed wherein the strip is initially somewhat shorter in circumferential length than the circumference of the packed member, so that a gap is left between the opposite ends of the strip, which gap gradually closes up as the strip wears, due to the contracting creep of the strip.

As shown in Figures 3 and 4, the strip may be divided longitudinally into two parts by a cut 30 that extends lengthwise of the strip from the back ridge through almost to the front face so as to leave a band 22 as described above. In this construction the transverse cuts 31 in one part may be staggered in relation to the cuts 32 in the other part. When the band 22 is worn away the strip will be divided into a number of wedges arranged in staggered relation each half the size of those provided by the construction shown in Figures 1 and 2 if the strips are originally of equal dimensions and if the band is the same thickness in each case.

Alternatively, as shown in Figure 5, the strip may be made in the form of a grooved bar 40 that is shown as having a wider flat upper face 41, a lower face 42 grooved in the form of a wide V and two narrower side faces 43 each at right angles to the adjacent limb of the V. The groove in the lower face has its narrower end directed towards the face 41. The bar has a number of cuts 44 or slots lying transversely to the general length of the bar. These cuts extend completely through the bar and are arranged spaced equally apart parallel one to another but do not extend far enough across the bar to reach the short sides 43. As shown in Figure 6, such a bar, when bent downwards about the longitudinal axis of the trough or groove in its underside, provides a wedge-shaped strip divided longitudinally as shown at 45 at the wearing face constituted by the sides 43. This strip is slotted at the back up towards the wearing face, a band of material divided into two parts being provided at that face.

The metal strip shown in Figures 7 and 8 differs from that described above with reference to Figures 5 and 6 only in that transverse cuts or slots 50 extend not at right-angles, but obliquely to the general length of the bar. When the bar is folded those portions of the cuts at one side of the resulting wedge-shaped strip will be staggered relatively to those portions at the other side, owing to the oblique setting of the cuts.

Figure 9 shows a bar 40 similar to that described above with reference to Figures 7 and 8, but having slanting cuts 50 each extended alternately at opposite ends into the adjacent side face 43 of the bar. Figure 10 shows a strip formed by folding the bar so as to close the V groove. In this construction as in those described above material at the base of the strip serves to connect together the parts of the strip bounded by the cuts and will lie against the member to be packed when the strip is in use.

Instead of making the strip shown in Figure 10 as just described it may be made by folding a bar 40 as shown in Figure 7, whereupon the cuts 50 may be each extended alternately at opposite ends in the base of the strip.

If desired, the bars shown in Figures 5, 7 and 9 may have a cross-section as shown in Figure 11, wherein the short sides 143 are at right-angles to the face 41. In this case the bar will be folded upwards about the longitudinal axis of the groove 42.

Figure 12 shows a strip 20 which differs from the strip 20 shown in Figure 1, only in its having a foot 81 provided on the ridge and extending laterally in both directions.

Figures 13 and 14 illustrate how such a foot 81 may be provided when the strip is formed from a bar 40 constructed as described above with reference to Figure 5. When the bar is in flat extended form the foot 81 is in the form of lugs attached each at one end along the middle of the flat face 41 and directed each towards one of the shorter sides 43 of the bar. The cuts 44 extend not only through the middle portion of the bar 40, but also through these lugs 81. When a strip having a foot such as 81 is embedded in a backing 23 as illustrated in Figure 14 it will be readily understood that even when the band 22 has become worn away the wedge-shaped pieces into which the strip is then divided will still be retained by the foot in the backing. The foot is preferably not so thick as to be rigid, but is preferably so thin as to yield under the effort of the thrust of a gland-nut, so that advance of the strip or of the wedges into which it is divided is not prevented, but is checked.

Obviously bars 40 as shown in Figures 7 and 9 may be provided with feet 81 in an analogous manner.

A bar 40 of the section shown in Figure 11 may be provided with a foot in an analogous manner as shown in Figure 15. In this case the lugs lie in the V groove 42 and are connected each at one end to the narrower end of the V. In this case, also, the cuts 44 may be arranged slantwise as shown in Figure 7 or 9.

Instead of the metallic strip being made integral as indicated in Figures 1-15, it may be made composite, for example it may be built up of a number of units 90, such as is shown in Figure 16, laid end to end with the flat faces at the ends of each unit in staggered relation. These units will be held together by the backing, which would be applied as a continuous body.

As shown in Figure 17 illustrating a further modification of packing strip according to the invention, the metal strip may be composite in the sense that it is divided longitudinally throughout its length into two strips such as 93 and 94, each of which may be constructed by dividing a strip as shown in Figure 12 into two halves by a central longitudinal cut. The two halves will then be placed side by side and provided with a backing.

Any of the metallic strips described above may be used without or with a backing such as 23 if desired.

It will be appreciated that various modifications may be made in the details of construction as described above without departing from the scope of the invention as defined in the claims. For example, the relative dimensions of the faces of the bar shown in Figures 5, 7, 9 and 11 may be varied considerably.

I claim:

1. A packing strip having transverse cuts that extend from that side of the strip which will be outermost when the packing is in its operative position in relation to a member to be packed, so far towards the opposite inner side of the strip as to leave at the base of the strip material which serves to connect together the parts of the strip bounded by said cuts and is intended to bear against the said member to be packed.

2. A packing strip having transverse cuts that extend from that side of the strip which will be outermost when the packing is in its operative position in relation to a member to be packed, so far towards the opposite inner side of the strip as to leave at the base of the strip material which serves to connect together the parts of the strip bounded by said cuts and is intended to bear against the said member to be packed which strip has also a longitudinal cut into which said transverse cuts run.

3. A packing strip having transverse cuts that extend from that side of the strip which will be outermost when the packing is in its operative position in relation to a member to be packed, so far towards the opposite inner side of the strip as to leave at the base of the strip material which serves to connect together the parts of the strip bounded by said cuts and is intended to bear against the said member to be packed which strip has also a longitudinal cut into which said transverse cuts run, the transverse cuts at one side of the longitudinal cut being staggered in relation to those at the other side thereof.

4. A packing strip having transverse cuts that extend from that side of the strip which will be outermost when the packing is in its operative position in relation to a member to be packed, so far towards the opposite inner side of the strip as to leave at the base of the strip material which serves to connect together the parts of the strip bounded by said cuts and is intended to bear against the said member to be packed some of which transverse cuts extend through said base of the strip.

5. A packing strip having transverse cuts that extend from that side of the strip which will be outermost when the packing is in its operative position in relation to a member to be packed, so far towards the opposite inner side of the strip as to leave at the base of the strip material which serves to connect together the parts of the strip bounded by said cuts and is intended to bear against the said member to be packed which transverse cuts extend each through a part of the said base of the strip.

6. A packing strip having tranverse cuts that extend from that side of the strip which will be outermost when the packing is in its operative position in relation to a member to be packed, so far towards the opposite inner side of the strip as to leave at the base of the strip material which serves to connect together the parts of the strip bounded by said cuts and is intended to bear against the said member to be packed which transverse cuts extend alternately through the base at opposite sides thereof.

7. A packing strip having transverse cuts that extend from that side of the strip which will be outermost when the packing is in its operative position in relation to a member to be packed, so far towards the opposite inner side of the strip as to leave at the base of the strip material which serves to connect together the parts of the strip bounded by said cuts and is intended to bear against said member to be packed which strip has also a longitudinal cut into which said transverse cuts run, which longitudinal cut extends through said base and divides it into two longitudinal parts, and said transverse cuts extend alternately through the longitudinal parts of the base.

8. A packing strip having a longitudinal cut and a plurality of transverse cuts, all of which transverse cuts extend from that side of the strip which will be outermost when the packing is in its operative position in relation to a member to be packed, so far towards the opposite inner side of the strip as to leave at the base of the strip material which serves to connect together the parts of the strip bounded by said cuts and is intended to bear against the said member to be packed, which transverse cuts at one side of the longitudinal cut are staggered in relation to the transverse cuts at the other side thereof.

9. A metallic packing strip in the form of a bar that is flat on one face and has its opposed face in the form of a V with the narrower end of the V lying towards said flat face, which bar has cuts that lie transversely of the direction of length of the bar, and extend through the middle of said flat face to the opposed face and outwards towards each side face of the bar.

10. A metallic packing strip in the form of a bar that is flat on one face and has its opposed face in the form of a V with the narrower end of the V lying towards said flat face, which bar has cuts that lie transversely of the direction of length of the bar, and extend through the middle of said flat face to the opposed face and outwards towards each side face of the bar, those portions of the cuts that lie at one side of the bar being staggered in relation to those portions that lie at the other side of the bar.

11. A metallic packing strip in the form of a bar that is flat on one face and has its opposed face in the form of a V with the narrower end of the V lying towards said flat face, which bar has cuts that lie transversely of the direction of length of the bar, and extend through the middle of said flat face to the opposed face and outwards towards each side face of the bar, which cuts have each at least one outer end that terminates at a point spaced away from the adjacent side face of the bar.

12. A metallic packing strip in the form of a bar that is flat on one face and has its opposed face in the form of a V with the narrower end of the V lying towards said flat face, which bar has cuts that lie transversely of the direction of length of the bar, and extend through the middle of said flat face to the opposed face and outwards towards each side face of the bar, which cuts each extend alternately at opposite ends into the adjacent side face of the bar, the other unextended ends of which cuts terminate each at a point spaced away from the respective adjacent side face of the bar.

13. Strip packing comprising a series of juxtaposed and integrally connected segments disposed end to end along the strip to form a core and having an initial wearing layer, the connecting portions between the segments being such that the core contracts by simple inward radial movement of the segments after its initial wearing layer has been worn away.

14. Strip packing comprising a series of juxtaposed and integrally connected segments disposed along the strip with the end face of one segment opposed to the end face of the adjacent segment and having an initial wearing layer, the strip being divided by incisions of such extent and arrangement that the segments move by simple inward radial movement after the initial wearing layer has been worn away, the end faces making substantially line contact with one another at the wearing face of the strip.

15. Strip packing whereof the strip is divided into a series of juxtaposed and integrally connected segments disposed along the strip with the end face of one segment opposed to the end face of the next, by a longitudinal partial division extending from the working face of the strip toward the back thereof, whereby a slender link of connecting material connects the side portions of the strip, and by two series of transverse incisions, one series being disposed on one side of the longitudinal division and the other series on the other side, said incisions extending from the back of the strip to the working face thereof and from the respective side faces of the strip to the longitudinal division, the incisions of one series being staggered relatively to those of the other.

16. Strip packing whereof the strip is divided into a series of juxtaposed and integrally connected segments disposed along the strip with the end face of one segment opposed to the end face of the next, by a longitudinal partial division extending from the working face of the strip towards the back thereof a distance sufficient to leave a slender link of connecting material between the side portions of the strip, and by two series of transverse incisions, one series being disposed on one side of the longitudinal division and the other series on the other side, the incisions extending from the back of the strip to the working face thereof, and from the respective side faces of the strip to the longitudinal division, the incisions of one series being staggered relatively to those of the other, the incisions being of such extent and general direction as to render the segments of substantially rectangular configuration in side elevation.

17. Strip packing according to claim 15, wherein the transverse incisions extend across the side portions of the strip pierced by the opposite series of incisions, but in said side portion extend from the back of the strip only partway towards the working face, thereby leaving a link of connecting material between the segments at said face.

18. Strip packing according to claim 15, wherein the transverse incisions of each series extend across that side portion of the strip which is pierced by the opposite series of incisions, extending in said portion from the back of the strip towards the working face thereof, but terminating short of said face to leave a temporary link of connecting material between the segments at such face, the link being of such slender proportions as to be worn away with the initial wearing layer of the strip, whereby the links are completely severed from one another.

19. Strip packing according to claim 16, wherein the transverse incisions of each series extend across that side portion of the strip which is pierced by the opposite series of incisions, extending in said portion from the back of the strip partway towards the working face whereby a link of material connects the segments at said face.

20. Strip packing according to claim 16, wherein the transverse incisions of each series extend across that side portion of the strip which is pierced by the opposite series of incisions, extending in said portion from the back of the strip towards the working face thereof, but terminating short of said face thereby leaving a temporary link of material connecting the segments of such slender proportions as to be worn away with the initial wearing layer of the strip, whereby the segments are completely severed from one another.

21. Strip packing comprising a soft metal V-shaped strip adapted to be placed around the part to be packed with the face at the top of the V constituting the working face of the strip, said strip being partially divided by central longitudinal cut extending from the working face towards the back of the strip, but terminating short of said back, and by a series of spaced transverse cuts extending from the back of the strip towards the working face thereof, each of said transverse cuts extending on one side of the central longitudinal division completely to the working face of the strip, and on the other side to a point short of said working face thereby leaving a slender link of connecting material between the segment on one side of the transverse cut produced by the central longitudinal division and the transverse cut and the segment on the opposite side of said cut, the transverse cuts being disposed in staggered relation with one another so that the cuts extend to the working face alternately one on one side of the central longitudinal division and the next on the other side thereof, the slender link of connecting material being of such depth in the direction perpendicular to the working face of the strip as to be worn away with the initial wearing layer of the strip.

In testimony whereof I affix my signature.

WILLIAM ROBERT BELDAM.